3,158,588
FIRE RETARDANT POLYMER COMPOSITIONS CONTAINING A DIMER OF HEXACHLOROCYCLOPENTADIENE

Arnold N. Johnson, Pines Lake, Wayne, N.J., assignor to Hooker Chemical Corporation, Niagara Falls, N.Y., a corporation of New York
No Drawing. Filed Jan. 30, 1961, Ser. No. 85,488
12 Claims. (Cl. 260—45.75)

This invention relates to novel fire retardant polymer compositions, and to methods for rendering polymeric materials fire retardant.

This is a continuation-in-part of my copending application Serial Number 518,340, filed June 27, 1955, now United States Patent 2,996,553 issued August 15, 1961, entitled, "Condensation of Hexachlorocyclopentadiene."

Polymeric materials are being used more widely every year in industrial applications such as wire coatings, pipes and conduits and for other industrial moldings and extruded products. These and other uses are better served by polymer compositions that are fire retardant and flame resistant. Prior art attempts to impart fire resistance to polymers by the use of additives have often adversely affected the desirable properties of the polymer.

Accordingly, it is an object of this invention to provide fire retardant polymer compositions. It is another object of this invention to provide methods for reducing the flammability of polymeric materials to the non-burning state. It is a further object to provide additives for polymeric materials that not only impart fire resistance but also enhance or preserve other physical properties of the polymer.

These and other objects are accomplished by providing polymer compositions comprising a polymeric material and the compound $C_{10}Cl_{12}$. The flame retardant characteristics of these polymer compositions are further improved by incorporating antimony compounds therein. Such compositions are found to have enhanced physical properties, such as heat distortion temperature, over the properties of the base resin.

The polymers embraced within the scope of this invention are the homopolymers and copolymers of unsaturated aliphatic, cycloaliphatic and aromatic hydrocarbons. Suitable monomers are ethylene, propylene, butene, pentene, hexene, heptene, octene, 2-methylpropene-1, 3-methylbutene-1, 4-methylpentene-1, 4-methylhexene-1, 5-methylhexene-1, bicyclo-(2.2.1)-2-heptene, butadiene, pentadiene, hexadiene, isoprene, 2,3-dimethylbutadiene-1,3, 2-methylpentadiene-1,3, 4-vinylcyclohexene, vinylcyclohexene, cyclopentadiene, styrene and methyl styrene, and the like.

Two of the polymers of this group, polyethylene and polystyrene, have long been known in the art. Low-density (0.92 gram/cc.) polyethylene is produced by the polymerization of ethylene at a pressure greater than twelve hundred atmospheres and at a temperature of one hundred to three hundred degrees centigrade. Lower pressures of about five hundred atmospheres can be used if a catalyst such as oxygen or benzoyl peroxide is added to the ethylene as described by Fawcett et al., Chem. Abs., 32, 1362 (1938).

Polystyrene is readily produced by mass, solution or emulsion polymerization as described in The Technology of Plastics and Resins, Mason, J. P. and Manning, J. F., Van Nostrand Company (1945). The polymerization is promoted by the action of light and catalysts such as hydrogen peroxide, benzoyl peroxide and other organic peroxides. Suitable solvents for solution polymerization are toluene, xylene and chlorobenzene.

In recent years a new field of linear and stereoregular polymers has become available which are suitable for use in the instant invention. These polymers are produced with organometallic catalysts and supported metal oxide catalysts as disclosed in great detail in Linear and Stereoregular Addition Polymers: Polymerization With Controlled Propagation, Gaylord, N. G., and Mark, H. F., Interscience Publishers, Inc. (1959). Monomers of the type disclosed hereinbefore are readily polymerized to solid polymers in the presence of a catalyst system comprising aluminum triethyl and titanium tetrachloride or titanium trichloride. The reaction is carried out in the presence of an inert, hydrocarbon solvent, suitably purified of catalyst poisons, at a temperature in the range of fifty to two hundred and thirty degrees centigrade. At the conclusion of the reaction, the polymer can be recovered from the resulting solution or suspension by evaporation of the diluent, whereupon the polymer is treated for removal of catalyst residues, for example by washing with water or alcohol, and acids. Metal oxide catalysts such as chromium oxide supported on silica or alumina are suitable for polymerizing the 1-olefins containing a maximum of eight carbon atoms, with no branching closer to the double bond than the 4-position. The polymerization is carried out in the manner described for the organometallic catalyst system.

The preparation of $C_{10}Cl_{12}$, a white crystalline solid, is disclosed in my United States Patent 2,724,730 and copending application Serial Number 518,340, now U.S. Patent 2,996,553. The compound, a dimer of hexachlorocyclopentadiene, is prepared by reacting hexachlorocyclopentadiene in the presence of aluminum chloride. If desired, a solvent reaction medium such as hexachlorobutadiene, carbon disulfide, petroleum ether, perchloroethylene or carbon tetrachloride may be used. The reaction mixture is heated to a temperature in the range between about forty degrees centigrade and the reflux temperature of said mixture, preferably between about sixty-five degrees and two hundred and thirty-five degrees centigrade, under the vapor pressure of the mixture at the temperature employed. The reaction product is water-washed at room temperature to effect the removal of aluminum chloride and the organic layer is dried with anhydrous sodium sulfate. The product may be further purified by distillation, followed by recrystallization from benzene to produce white crystals. The compound has a melting range of four hundred and eighty-three degrees to four hundred and eighty-seven degrees centigrade.

Antimony oxide is the antimony compound that is presently preferred for use in the present invention. However, many antimony compounds are suitable. Inorganic antimony compounds include antimony sulfide, sodium antimonite, potassium antimonate, and the like. Many organic antimony compounds are suitable such as the antimony salts of organic acids and their pentavalent derivatives, disclosed in copending application Serial Number 688,143, filed October 4, 1957, now U.S. Patent 2,996,528, issued August 15, 1961, entitled "Trivalent Antimony Salts of Organic Acids and Their Pentavalent Derivatives and Methods of Preparing Same." Compounds of this class include antimony butyrate, antimony valerate, antimony caproate, antimony heptylate, antimony caprylate, antimony pelargonate, antimony caprate, antimony cinnamate, antimony anisate and their pentavalent dihalide derivatives. Likewise the esters of antimonous acids and their pentavalent derivatives disclosed in copending application Serial Number 688,108, filed October 4, 1957, now U.S. Patent 2,993,924, issued July 25, 1961, entitled, "Esters of Antimonous Acid and Their Pentavalent Derivatives and Methods of Preparing Same," such as tris (n-octyl)antimonite, tris(2-ethylhexyl) antimonite, tribenzyl antimonite, tris($\beta$-chloroethyl) antimonite, tris($\beta$-chloropropyl) antimonite, tris($\beta$-chlorobutyl) antimonite and their pentavalent dihalide derivatives. Still other suitable organic antimony compounds are the cyclic antimonites such as trimethylolpropane antimonite, pentaerythritol antimonite, and glycerol antimonite. The corresponding arsenic and bismuth compounds can also be employed.

The components comprising the compositions of the instant invention can be mixed by any one of several methods. The additives can be introduced into the polymer while the latter is dissolved in a suitable solvent. This procedure is especially useful when it is desired to mix the additives during the polymer manufacturing process. When the polymer is subsequently recovered from the solvent, the additives are intimately mixed with the polymer. Usually the additives are mixed with the polymer in the molten state at temperatures that can range from the melting point to the decomposition temperature of the polymer. Alternatively the additives and polymer are dry-blended in the finely divided state so that an intimate mixture is obtained upon subsequent molding or extrusion.

The chlorinated compound of the instant invention is desirably incorporated in polymeric materials in the range from about ten to about fifty percent by weight of the polymer composition, preferably from about twenty to about thirty-five percent by weight. The antimony compound can be used in amounts ranging from less than one to about thirty percent by weight of the polymer composition, preferably from about ten to about twenty percent by weight.

The invention is illustrated by the following examples which are not intended to limit the scope of this invention.

In these examples the properties of the molded polymer compositions were tested in accordance with standard ASTM test procedures as follows:

Heat distortion temperature ____ ASTM D 648–56 (using 264 p.s.i. fiber stress).
Burning characteristics _____ ASTM D 635–56T.

In the latter test, a specimen can fall into one of three categories: (1) Burning (the rate is reported), (2) Self-extinguishing upon removal of flame, and (3) Non-burning. In these examples the length of time the specimens burned after the flame was removed is reported. Usually a range for several specimens is given.

EXAMPLE 1

A sample of polypropylene prepared by organometal-catalyzed polymerization of propylene was heated in the roller head of a Brabender Plastograph for about five minutes at two hundred to two hundred and five degrees centigrade and then discharged into a mold. The compression molded specimen had a heat distortion temperature of seventy-nine degrees centigrade and burned at a rate of 1.3 inches per minute.

EXAMPLE 2

Eighty parts by weight of the type of polypropylene used in Example 1 was mixed with twenty parts of $C_{10}Cl_{12}$ in the roller head of the Plastograph using the conditions of Example 1. The resulting compression molded specimen had a heat distortion temperature of eighty-nine degrees centigrade and burned slowly at 0.6 inch per minute.

In the same manner as in Example 2, additional polypropylene compositions were prepared and tested. Antimony oxide was incorporated in many of these compositions. The results appear in Table I for comparison with Examples 1 and 2.

*Table I*

| Example | $C_{10}Cl_{12}$, Wt. percent | $Sb_2O_3$, Wt. percent | Heat Distortion Temp., °C. | Burning Characteristics |
|---|---|---|---|---|
| 1 | 0 | 0 | 79 | Burning rate: 1.3 in./min. |
| 2 | 20 | 0 | 89 | Burning rate: 0.6 in./min. |
| 3 | 35 | 0 | 88 | Self-extinguishing in 37–68 sec. |
| 4 | 20 | 2.2 | 81 | Self-extinguishing in 30–195 sec. |
| 5 | 20 | 10 | 92 | Self-extinguishing in 3–6 sec. |
| 6 | 30 | 10 | 89 | Self-extinguishing in 0–2 sec. |
| 7 | 20 | 20 | 88 | Self-extinguishing in 4–12 sec. |
| 8 | 30 | 20 | 93 | Self-extinguishing in 0–10 sec. |
| 9 | 10 | 30 | 88 | Self-extinguishing in 16–58 sec. |

EXAMPLE 10

The procedure of Example 5 was repeated except that 0.75 part of dibutyltin dilaurate was mixed into the composition. The molded specimen had a heat distortion temperature of ninety-two degrees centigrade and was self-extinguishing in three to six seconds. The specimen had an excellent physical appearance indicating the organic tin compound had imparted additional heat stability to the composition.

In the following examples, $C_{10}Cl_{12}$ was incorporated in linear polyethylene produced by polymerizing ethylene in the presence of a supported chromium oxide catalyst. The mixing method was the same as in Example 2 except that the temperature was one hundred and sixty-five degrees centigrade.

*Table II*

| Example | $C_{10}Cl_{12}$, Wt. percent | $Sb_2O_3$, Wt. percent | Heat Distortion Temp., °C | Burning Characteristics |
|---|---|---|---|---|
| 11 | 0 | 0 | 54 | Burning rate: 0.7 in./min. |
| 12 | 20 | 10 | 66 | Burning rate: 0.5 in./min. |
| 13 | 30 | 10 | 66 | Self-extinguishing in 3–6 sec. |

In the following examples, $C_{10}Cl_{12}$ was incorporated into polyethylene of the type produced by the high pressure process and having a density of 0.92 gram per cc. The mixing method was the same as in Example 2 except the temperature was one hundred and sixty-five degrees centigrade.

*Table III*

| Example | $C_{10}Cl_{12}$, Wt. percent | $Sb_2O_3$, Wt. percent | Heat Distortion Temp., °C | Burning Characteristics |
|---|---|---|---|---|
| 14 | 0 | 0 | 42 | Burning rate: 0.9 in./min. |
| 15 | 20 | 10 | 41 | Burning rate: 0.5 in./min. |
| 16 | 30 | 10 | 45 | Self-extinguishing in 5–16 sec. |

In the following examples, $C_{10}Cl_{12}$ was incorporated into emulsion-polymerized polystyrene. The mixing method was the same as in Example 2 except that the temperature was two hundred and seven degrees centigrade.

Table IV

| Example | $C_{10}Cl_{12}$, Wt. percent | $Sb_2O_3$, Wt. percent | Heat Distortion Temp., °C | Burning Characteristics |
|---|---|---|---|---|
| 17 | 0 | 0 | 84–88 | Burning. |
| 18 | 20 | 10 | 89 | Non-burning. |
| 19 | 30 | 10 | 90 | Do. |

EXAMPLE 20

Seventy parts of polypropylene pellets were passed through a Wiley Laboratory cutting mill equipped with a twenty mesh screen, and then mixed at room temperature with twenty parts of $C_{10}Cl_{12}$ and ten parts of antimony oxide, both of which had a particle size of two microns or less. The mixture was tumbled and then passed through the Wiley Mill. The tumbling procedure was repeated twice, followed by tumbling to produce a uniform mixture. The resultant powder, which was free-flowing and free of static charges was molded by injection and compression molding. The molded specimens were white in appearance, had high gloss, were tough, stiff and strong. The injection molded specimen had a heat distortion temperature of sixty-six degrees centigrade compared to sixty degrees centigrade for the parent polymer. The sample was self-extinguishing in thirteen to fifty-six seconds. The compression molded specimen had a heat distortion temperature of ninety-two degrees centigrade compared to seventy-nine degrees centigrade for the parent resin.

EXAMPLE 21

A sample of polyethylene of the type used in Example 13 was mixed with twenty parts by weight of $C_{10}Cl_{12}$ and ten parts of antimony oxide. An injection molded specimen produced in the manner of Example 20 had a heat distortion temperature of fifty degrees centigrade and was self-extinguishing in six to fourteen seconds.

EXAMPLE 22

Seventy parts by weight of polystyrene was mixed with twenty parts $C_{10}Cl_{12}$ and ten parts of antimony oxide. Injection and compression molded specimens were produced as in Example 20. The compression molded specimen had a heat distortion temperature of eighty-nine degrees centigrade compared to eighty-four to eighty-eight degrees centigrade for the base resin, and was self-extinguishing in zero to one second. The injection molded specimen had a heat distortion temperature of eighty degrees centigrade.

From the foregoing examples, it is evident that the incorporation of $C_{10}Cl_{12}$ into hydrocarbon polymers imparts fire retardance to the polymer by slowing the burning rate in all cases, and by rendering the polymers self-extinguishing or non-burning at the higher concentrations. The fire retardant characteristics of the compositions are further enhanced by also incorporating an antimony compound therein.

It was quite surprising to find that the incorporation of the additives of the instant invention into the polymers greatly enhanced the thermal properties as exemplified by the heat distortion temperature, whereas it would normally be expected that such characteristics would be adversely affected. Moreover it was found that the compositions of this invention could be molded readily at temperatures about fifty degrees centigrade lower than temperatures required for the parent polymers. This advantage is extremely important in industrial molding and extrusion operations both from the standpoint of heat economy and also reducing the degradation of the polymer. Additionally, it was found that the compositions of the invention have less tendency to drip in contact with a flame, thereby further reducing the hazard of using hydrocarbon polymers in industrial applications where the spreading of burning molten material can be a serious problem in the event of a fire. Examples 20 to 22 showed that the excellent results were also obtained with dry blending procedures.

The use of dibutyltin dilaureate was disclosed in Example 10. It is also within the scope of the invention to use other heat stabilizers such as basic lead phosphite, basic lead carbonate and the like. Likewise other additives such as carbon black, colored pigments and the like can be utilized without departing from the spirit of the invention.

Having thus described my invention, I claim:

1. A fire retardant polymer composition comprising a polymer of an ethylenically unsaturated hydrocarbon, and the dimer of hexachlorocyclopentadiene having the formula $C_{10}Cl_{12}$ and having a melting range of 483 to 487 degrees centigrade in sufficient proportion to improve the fire retardancy of the polymer composition.

2. The composition according to claim 1 wherein the polymer is polyethylene.

3. The composition according to claim 1 wherein the polymer is polypropylene.

4. The composition according to claim 1 wherein the polymer is polystyrene.

5. A fire retardant polymer composition comprising a polymer of an ethylenically unsaturated hydrocarbon and the dimer of hexachlorocyclopentadiene having the formula $C_{10}Cl_{12}$ and having a melting range of 483 to 487 degrees centigrade in sufficient proportion, up to 50 percent by weight of the polymer composition, to improve the fire retardancy of the polymer composition.

6. A fire retardant polymer composition comprising a polymer of an ethylenically unsaturated hydrocarbon, the dimer of hexachlorocyclopentadiene having the formula $C_{10}Cl_{12}$ and having a melting range of 483 to 487 degrees centigrade in sufficient proportion to improve the fire retardancy of the polymer composition and an antimony compound.

7. The composition according to claim 6 wherein the antimony compound is antimony oxide.

8. A fire retardant polymer composition comprising a polymer of an ethylenically unsaturated hydrocarbon, from about 10 to 50 percent by weight of the dimer of hexachlorocyclopentadiene having the formula $C_{10}Cl_{12}$ and having a melting range of 483 to 487 degrees centigrade and from 1 to 30 percent by weight of antimony oxide, the compound $C_{10}Cl_{12}$ and antimony oxide being present in sufficient total proportion to improve the fire retardancy of the polymer composition.

9. The method of imparting fire resistance to a polymer of an ethylenically unsaturated hydrocarbon which comprises heating the polymer to a molten state and incorporating therein the dimer of hexachlorocyclopentadiene having the formula $C_{10}Cl_{12}$ and having a melting range of 483 to 487 degrees centigrade in sufficient proportion to improve the fire retardancy of the polymer composition.

10. The method according to claim 9 wherein the polymer is polyethylene.

11. The method of imparting fire resistance to a polymer of an ethylenically unsaturated hydrocarbon which comprises heating the polymer to a molten state and incorporating therein the dimer of hexachlorocyclopentadiene having the formula $C_{10}Cl_{12}$ and having a melting range of 483 to 487 degrees centigrade in sufficient proportion to improve the fire retardancy of the polymer composition and an antimony compound.

12. The method according to claim 11 wherein the antimony compound is antimony oxide.

References Cited in the file of this patent

UNITED STATES PATENTS

| 2,909,501 | Robitschek et al. | Oct. 20, 1959 |
| 2,924,532 | Dereich | Feb. 9, 1960 |
| 2,996,553 | Johnson | Aug. 15, 1961 |